(12) United States Patent
Broekman

(10) Patent No.: US 10,478,904 B2
(45) Date of Patent: Nov. 19, 2019

(54) HOLE SAW ASSEMBLY

(71) Applicant: GRIPP-X B.V., Ede (NL)

(72) Inventor: Hendrikus Johannes Broekman, Lunteren (NL)

(73) Assignee: GRIPP-X B.V., Ede (NL)

(*) Notice: Subject to any disclaimer, the term of this patent is extended or adjusted under 35 U.S.C. 154(b) by 0 days.

(21) Appl. No.: 16/099,682

(22) PCT Filed: Jun. 8, 2017

(86) PCT No.: PCT/EP2017/064051
§ 371 (c)(1),
(2) Date: Nov. 7, 2018

(87) PCT Pub. No.: WO2017/212002
PCT Pub. Date: Dec. 14, 2017

(65) Prior Publication Data
US 2019/0193173 A1   Jun. 27, 2019

(30) Foreign Application Priority Data
Jun. 8, 2016  (EP) ..................................... 16173615

(51) Int. Cl.
*B23B 51/05* (2006.01)
*B23B 51/04* (2006.01)
(Continued)

(52) U.S. Cl.
CPC ........ *B23B 51/0473* (2013.01); *B23B 31/107* (2013.01); *B23B 51/0426* (2013.01); *B27B 5/12* (2013.01); *B27B 5/32* (2013.01)

(58) Field of Classification Search
CPC .............. B23B 31/107; B23B 51/0426; B23B 51/0473; B27B 5/12; B27B 5/32
(Continued)

(56) References Cited

U.S. PATENT DOCUMENTS 756,377 A * 4/1904 Kimber ................. B23B 31/202
279/32
2,313,763 A * 3/1943 Olsen ...................... E01B 11/38
411/223
(Continued)

FOREIGN PATENT DOCUMENTS

DE      202013006690 U1    8/2013
EP          1555076 A1 *   7/2005    ......... B23B 51/0426
(Continued)

*Primary Examiner* — Nicole N Ramos
(74) *Attorney, Agent, or Firm* — AEON Law, PLLC; Adam L. K. Philipp; David V. H. Cohen

(57) ABSTRACT

A device for more efficient coupling and de-coupling of a hole saw to an arbor. A hole saw has a bottom wall with a central threaded hole. The arbor's clamping device has first and second thread-engaging parts for engaging the internal thread in the hole saw's bottom hole. The thread-engaging parts are moveable with respect to one another perpendicular to the longitudinal direction of the hole saw. When the thread-engaging parts are in a first, disengaged position, the clamping device allows retraction from or insertion into the hole saw's bottom hole substantially longitudinally. When the thread-engaging parts are in a second or engaged position having a larger circumference, the clamping device engages the internal thread in the hole saw's bottom hole for clamping the clamping device in the hole. The clamping device used in the hole saw provides a quick-coupling for mounting a hole saw on an arbor.

12 Claims, 8 Drawing Sheets

(51) Int. Cl.
  *B23B 31/107* (2006.01)
  *B27B 5/12* (2006.01)
  *B27B 5/32* (2006.01)

(58) Field of Classification Search
  USPC .............. 408/204, 206, 68, 79, 80, 81, 82
  See application file for complete search history.

(56) References Cited

U.S. PATENT DOCUMENTS

| | | | |
|---|---|---|---|
| 2,335,614 A * | 11/1943 | Spievak | B23B 47/284 |
| | | | 408/84 |
| 2002/0131835 A1* | 9/2002 | Despres | B23B 51/0453 |
| | | | 408/204 |
| 2004/0161313 A1 | 8/2004 | Nordlin et al. | |
| 2004/0247405 A1* | 12/2004 | Keightley | B23B 31/107 |
| | | | 408/204 |
| 2009/0279972 A1 | 11/2009 | Novak et al. | |
| 2011/0170968 A1* | 7/2011 | Moffatt | B23B 51/0473 |
| | | | 408/204 |
| 2011/0255931 A1 | 10/2011 | Murdie et al. | |
| 2015/0352645 A1* | 12/2015 | Spera | B23B 51/0473 |
| | | | 408/204 |
| 2017/0252834 A1* | 9/2017 | Spera | B23B 51/0473 |
| 2018/0333789 A1* | 11/2018 | Spera | B23B 31/1074 |

FOREIGN PATENT DOCUMENTS

| | | |
|---|---|---|
| WO | 0138028 A1 | 5/2001 |
| WO | 2004011179 A1 | 2/2004 |
| WO | 2005120754 A1 | 12/2005 |
| WO | 2006062388 A1 | 6/2006 |
| WO | 2006122417 A1 | 11/2006 |

* cited by examiner

HOLE SAW ASSEMBLY

FIELD OF THE INVENTION

The invention relates to a hole saw assembly

BACKGROUND OF THE INVENTION

The problem of coupling of a hole saw to an arbor has been the subject of many patent publications. In industrial and professional applications, sets of differently sized hole saws are used. The hole saws are often cup-shaped with a generally cylindrical skirt connected or co-formed on or with a support portion or carrier plate and saw teeth on a free end. An arbor connects the hole saw to a driving machine, like a drill. Currently, the centre of the carrier plate is provided with an internal screw thread or screw-threaded hole. The arbor has an external screw thread matching the internal thread of the hole. In this way, many types and sizes of hole saws can be fitted onto an arbor.

It was found that in use, the hole saw tends to get locked onto the arbor, making it almost impossible to remove the hole saw from the arbor. To that end, one or more driving pins are provided on the arbor to prevent this (too) tight locking. This, however, requires more complex constructions of the arbor. Several designs are explained in the following patent publications.

U.S. Pat. No. 3,880,546 according to its abstract describes a hole saw assembly including an arbor which comprises a stem, a body, a pilot drill carried by the body, and spring-loaded connecting means adapted to engage appropriate complemental locking means in the base of the cup-shaped hole saw. The hole saw has appropriate arcuate apertures in its base and appropriate inclined ramps which will, upon insertion and twisting movement of the arbor relatively of the saw, permit the spring-loaded locking means to be engaged by the ramps and snapped into place so as to secure the saw to the arbor in secure flush position. A modified form of the invention is also disclosed in which the spring-loaded locking means include fixed T-shaped studs or pins and ball detent means which also engage the base of the saw.

GB2257381 according to its abstract describes an arbor for a hole saw that includes a spindle with a screwthreaded end length for threaded engagement in a screwthreaded hole in a carrier plate part of the hole saw. So that the hole saw does not become tightly locked in position on the arbor, means provided for drivably connecting the hole saw to said spindle include at least one drive pin extending through a clearance hole in a fixed collar and engaging a hole in the carrier plate part of the hole saw. The drive pin is carried by a collar which is slidably mounted on a portion of the spindle, said collar being acted on by a coil compression spring reacting against a washer backed by a circlip.

Many alternatives provide an adapter that is attached to a hole saw and that provides an end of a quick coupling to the arbor. The arbor in turn has a quick-coupling provision that cooperates with the (complementary) quick coupling provision on the adapter. Examples of these solutions are illustrated in the following publications.

DE202013006690U1 according to its abstract describes a holder for coupling a hole saw with a mechanical drive comprising a holding shank for connection to the machine drive, characterized in that the receptacle has a tool-free with the holding shank connectable, the hole saw stationary associated connecting piece.

US20090279972 according to its abstract describes an arbor for quick change and standard hole cutters, wherein each hole cutter includes a central aperture and at least one drive pin aperture. The arbor comprises an arbor body including an end portion engageable within the central aperture, a drive shank opposite the end portion for engaging a power tool, and an aperture for receiving a pilot bit. The arbor further comprises a drive pin plate and/or collar having at least one drive pin receivable in a corresponding drive pin aperture of the hole saw for drivingly engaging the hole saw. The arbor, in at least one embodiment, further comprises a pilot bit mechanism for engaging and releasing a quick change or standard pilot bit.

US20110255931 according to its abstract describes a hole saw arbor system includes a tool-bit holder comprising a body having a proximal end and a distal end, the proximal end configured to be coupled to and driven by a driving device. A substantially longitudinal tool-bit holder bore may extend from the proximal end to the distal end of the body, the bore configured to receive a drill bit. The system further includes an arbor configured to be releasably coupled to a portion of the drill bit. The arbor may include a body having a proximal end and a distal end, the proximal end configured to matingly engage the distal end of the tool-bit holder when the arbor is coupled to the drill bit. The distal end may be configured to be coupled to a hole saw. A substantially longitudinal arbor bore may extend from the proximal end to the distal end of the body, the arbor bore being configured to receive the drill bit. The arbor may further include a locking mechanism positioned within a portion of the body, the locking mechanism configured to releasably couple the arbor to at least a portion of the drill bit when the drill bit is within the arbor bore.

WO2001038028 according to its abstract describes a hole saw assembly that provides a structure and method for efficiently and securely connecting a hole saw to an arbor and easily connecting a pilot bit to the arbor. The arbor has a shank opposite a coupling end and a receiving slot proximate to the coupling end. The receiving slot is adapted to receive a mounting tag of the hole saw to couple the hole saw to the adapter body. The arbor also includes a selector sleeve slidably coupled to the body for movement between a first position allowing the receiving slot to receive the hole saw and a neutral position wherein the selector sleeve prevents removal of the hole saw mounting tab from the receiving slot.

WO2006062388 according to its abstract describes a quick-change arbor for a tool, in particular a hole saw, the arbor comprising a longitudinal body having a drive end and a tool end, means for attaching the tool which are provided with a central hole allowing a sliding of the attachment means over the longitudinal body, and means for rotationally and axially locking the attachment means to the longitudinal body. The attachment means are slidably releasable from the longitudinal body, and can after applying a latch in the attachment means simply be slid over the body in order to push a plug of the sawn material out of the hole saw.

WO2006122417 according to its abstract describes a quick connect mechanism for mounting a hole saw to a tool comprising a hole saw; a mandrel having a first end for mounting to the hole saw and a second end for mounting to the tool; and a drill bit, assembled within the mandrel such that when the mandrel is connected to the hole saw, the drill bit being concentrically centred within the hole saw; a holder, mounted to the tool, for receiving the second end of the mandrel; wherein the second end of the mandrel includes quick connect means for easily mounting the mandrel to and releasing the mandrel from the holder.

Many adapters are complex, remain on the hole saw, require complex coupling actions from a user, or have other disadvantages. Thus, coupling a hole saw to a driving apparatus provides a problem.

SUMMARY OF THE INVENTION

The invention seeks to provide a device for coupling a hole saw. In particular, the invention seeks to provide a device for more efficient coupling and de-coupling such a hole saw, in particular coupling and de-coupling to an arbor for coupling to a driving apparatus.

To that end, the invention provides a hole saw assembly comprising a hole saw and an arbor for coupling said hole saw to a driving tool, said hole saw comprising a bottom wall provided with a hole with internal thread having a major and a minor thread diameter, and said arbor comprising a clamping device having a first and a second thread-engaging part, said first thread-engaging part extending in a longitudinal direction and having a first external surface for in use engaging the internal thread;
said second thread-engaging part extending in said longitudinal direction and having a second external surface for in use engaging the internal thread;
said first and second thread-engaging parts moveable with respect to one another with a component in a direction perpendicular to said longitudinal direction, allowing said first and second thread-engaging parts to displace between a first or disengaged position with respect to one another for together providing a first circumference allowing retraction from or insertion in said hole in a substantially longitudinal direction, and a second or engaged position having a second circumference that is larger than the first circumference, and in said second position said first and second external surfaces engaging said internal thread for clamping said clamping device in said hole.

The clamping device used in the hole saw provides a quick-coupling for mounting a hole saw on an arbor.

In this application, reference is made to longitudinal cylinder segments. In general, this relates to parts of a cylinder that are defined partly by a cylinder wall, and partly by planes that run functionally or substantially parallel to a longitudinal axis of a cylinder. In fact, when referring to thread, the cylinder refers to a circle cylinder. A particular example is a cylinder segment that is defined as a "horizontal cylinder segment". Usually, thus refers to a cylinder that is oriented with its longitudinal axis horizontally. A solid cut from such a horizontal cylinder by a single plane oriented parallel to the cylinder's axis of symmetry (longitudinal axis) is called a horizontal cylindrical segment.

In this current application, in an embodiment, the thread-engaging parts are longitudinal cylinder segments that have a spacing such that the thread-engaging pasts can be brought together in such a way that they can be removed from a hole with an internal thread. In particular, these thread-engaging parts can be opposite horizontal cylinder segments, i.e., each having a plane substantially or functionally parallel to the longitudinal axis of the cylinder. In particular, at least one of these planes is at a distance from the longitudinal axis. More in particular, both these planes are parallel to one another and at a distance from the longitudinal axis. A design that is relatively easy to make has planes at a distance from the longitudinal axis of the cylinder.

In an embodiment, one of the walls of the thread-engaging parts is part of a cylinder wall. This wall is for engaging the internal thread of the hole. This surface may for instance de of a polymer material of have a metal surface and may be provided with a ribbed or profiled structure in order to better engage the internal thread. In an embodiment, the thread-engaging surface is provided with thread that matches the internal thread of the hole. In this way, a good engagement can be provided. In fact, if the thread-engaging parts are blocked at their second or engaging position, the clamping part is mounted inside the thread almost as good as a threaded end would be. Such a blocking coupled for instance be accomplished by inserting a blocking like a wedge or pin between the thread-engaging parts.

The engaging of the thread-engaging parts may also be accomplished in an embodiment by biasing the thread-engaging parts away from one another. One or more of the thread-engaging pasts may for instance be spring-biased away from the longitudinal cylinder axis, in particular in a radial direction. Thus, in fact the spring force thus can be equivalent to a clamping force of the clamping device. In an embodiment, the biasing force has a component in a radial direction of the thread to be clamped.

Additionally, in order to prevent the hole saw from locking itself on the arbor, usually the arbor and/or the hole saw are provided with provisions for transferring torsion or rotational forces from the arbore to the hole saw, for instance by rotationally locking or blocking the hole saw on and/or with respect to the arbor. In an embodiment in order to prevent a possible rotation of a clamped part with respect to the clamping device, the clamping device is provided with a rotation-blocking that engages the clamped part. In an embodiment, the clamping device may be provided with one or more rotation-blocking members. The one or more rotation-blocking members may comprise one or more pins mounted on the mounting part that is provided to engage a hole in a clamped part. In an embodiment, such one or more pins extend functionally parallel to the first and second thread-engaging parts. In an often-used embodiment, one or more pins are provided on the arbor that reach into one ore more corresponding recesses or holes in the hole saw bottom. It is evident that this may also be reversed, although not commonly used: the hole saw bottom may have one or more pins reaching into recesses in the arbor.

In an embodiment, the clamping device comprises a blocking part for blocking said first and second thread-engaging parts in said second position.

In an embodiment, the first and second thread-engaging parts are biased away from one another.

In an embodiment, the external surface of said first and second thread-engaging parts comprise external thread parts corresponding to said internal thread.

In an embodiment, the first and second thread-engaging parts are longitudinal cylinder segments.

In an embodiment, the first and second thread-engaging parts have a spacing of at least two times the difference between the major and minor thread diameter of the internal thread.

In an embodiment, the thread-engaging parts in said second position have a diameter for engaging the internal thread and blocking removal of said clamping device from said internal thread by displacing said clamping device in longitudinal direction of said internal thread, and in said first position a diameter for staying clear from said internal thread for allowing removing said clamping device from said internal thread by displacing the clamping device in longitudinal direct of said internal thread.

In an embodiment, the first and second thread-engaging parts are spaced apart in said second position, wherein in particular said spacing providing a clearance that measures at least a twice a difference between an major internal thread diameter and a minor internal thread diameter of said internal thread of said hole.

In an embodiment, the first and second thread-engaging parts are biased away from one another at least to said second position, for allowing the first and second thread to be brought into said first position under elevation of said biasing force.

In an embodiment, the first and second thread-engaging parts form part of a threaded end with an external thread, said thread-engaging parts in an embodiment forming horizontal circle cylinder segments having a clearance allowing the thread-engaging parts to be displaced between the first and second position, in particular said thread-engaging parts in said second position forming part of a circle cylinder, and for displacing between said first and second position, said thread-engaging parts displace in a radial direction of said circle cylinder.

In an embodiment, thread-engaging parts move between said first and second position in a radial direction with respect to said thread or said cylinder. In an embodiment, two thread-engaging parts move along a line, linearly. Two thread-engaging parts move is such an embodiment in an opposite direction. A mounding part and thread-engaging parts moveable with respect to the mounting part may be provided. In an embodiment, the mounting part and the thread-engaging parts comprise linear-motion guiding for guiding said linear motion. In an embodiment, one of the mounting part and the thread-engaging parts comprises a linear guiding rail and the other one or ones of the mounting part and the thread-engaging parts comprises a linear guiding rail engaging end. In an embodiment, one of the thread-engaging parts and the mounting part comprises a slotted hole, and the other comprises a pin running in said slotted hole. In an embodiment, blocking means are provided for blocking the thread-engaging parts at the first and second positions. In an embodiment, the thread-engaging parts comprise a sledge that is radially displaceable on a mounting part.

In an embodiment, a thread-engaging part comprises a rail and another thread-engaging part comprises a guide for running on the rail. In such an embodiment, the relative motion of thread-engaging parts with respect to one another is defined.

In an embodiment, the first and second thread-engaging parts are spaced apart in said second position, wherein in particular said spacing providing a clearance that measures at least a difference between a major internal thread diameter and a minor internal thread diameter of a given internal thread into which said clamping device is designed to clamp. In particular, the spacing can be up to a fifth, a fourth or a third of the major diameter. This enables quick and secure assembly. In particular, the spacing should be dimensioned in such a way as to enable the parts to be released quickly and safely without any of the parts being too weakened in their cross-section In an embodiment in the engagement position the thread parts form an engagement cylinder that has a circumference. In an embodiment, the cross sectional area of one thread-engaging parts differs from the cross sectional area of another thread-engaging part.

In an embodiment, the thread-engaging parts each have less than 40% of the engagement cylinder circumference. In an embodiment, a larger thread-engaging part has between 30-40% of the engagement cylinder circumference. In an embodiment a smaller thread-engaging part has between 20-30% of the engagement cylinder circumference.

In an embodiment, the hole saw in its bottom wall has a hole provided with an internal thread has a major diameter $D5$, and a minor diameter $Dm$. In the first position the thread-engaging parts have an engaging diameter $D2$. In order to be able to remove the clamping device from the centred hole with an internal thread ('pull it out of the centred hole, parallel to a longitudinal direction $L$), this engaging diameter $D2$ should be smaller than the minor diameter $Dm$ of the internal thread. In that way, a quick-release coupling can be provided.

In an embodiment, thread-engaging parts are provided on a sledge mounted on a mounting part. In an embodiment, the mounting part and sledge parts have a provision for providing a linear motion (i.e., along a straight line) when the first and second thread-engaging parts move between the first and second positions. In this embodiment, the mounting part has a slotted hole for each thread-engaging part. The thread-engaging parts in turn each have an extended part that is provided for running in one of the respective slotted holes. The pin and slotted hole may also be reversed, providing the mounting part with pins and the sledge parts with a slotted hole.

In an alternative embodiment, one or more rails and corresponding runners may be provided on one of the mounting parts and the tread-engaging parts for providing the linear motion.

In an embodiment, the linear motion is in a radial direction of a thread to be clamped, or defined alternatively, radially with respect to the cylinder defined by the thread-engaging parts.

The sledge or sledged may be mounded for moving at a slight angle with respect to the longitudinal axis. The slight angle can be between 3 and 7 degrees, for instance between 4 and 6 degrees. The thread-engaging parts will remain substantially parallel to the longitudinal axis when moving or displacing.

In an embodiment, the first and second thread-engaging parts are biased away from one another at least to said second position, for allowing the first and second thread to be brought into said first position under elevation of said biasing force. In particular, said thread-engaging parts are spring-biased. In an embodiment, the biased force has a working component along or parallel to the linear motion of the thread-engaging part or parts. The spring-biased force may be applied via a coil spring, for instance, of via an alternative member that under compression provides an equivalent spring force.

The clamping device as such may also be used for coupling other tools that comprise or may be provided with an hole with an internal thread.

In an embodiment, the thread-engaging parts extend through the hole and out of the hole and comprise on a part extending out of said hole one or more radially extending members. These members may additionally secure the hole saw in the longitudinal direction on the clamping device. This would however require a larger interspacing of the thread-engaging parts. In fact, at least the radial extension has to be added to the interspacing. In an extreme further engineering of such an embodiment, the thread-engaging parts do not actually engage the thread any more. This would, however, reduce stability of the coupling of the clamping device and the hole saw, putting a higher demand of other design parameters of other parts.

The person skilled in the art will understand the term "substantially" in this application, such as in "substantially encloses" or in "substantially extends up to". The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally", when used for instance in "functionally coupled" will be understood by, and be clear to, a person skilled in the art. Where applicable, the term "functionally" may also relate to 90% or higher, such as 95% or higher, especially 99% or higher, even more especially 99.5% or higher, including 100%. In fact, "functionally" is used to indicate that features relate to one another in such a way that deviations from the exact relation are possible as long as the functioning is present. When for instance computer devices are "functionally coupled", this means that they may be coupled via a wired connection, a wireless connection, and the like.

Furthermore, the terms first, second, third and the like if used in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The device and elements herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawing in which corresponding reference symbols indicate corresponding parts, showing in:

FIGS. 7 to 10 show a further embodiment of the clamping device, in which FIG. 7 shows a perspective view, FIG. 8 a top view and FIGS. 9 and 10 cross sections as indicated.

The drawings are not necessarily on scale.

DESCRIPTION OF PREFERRED EMBODIMENT

Figure 1:
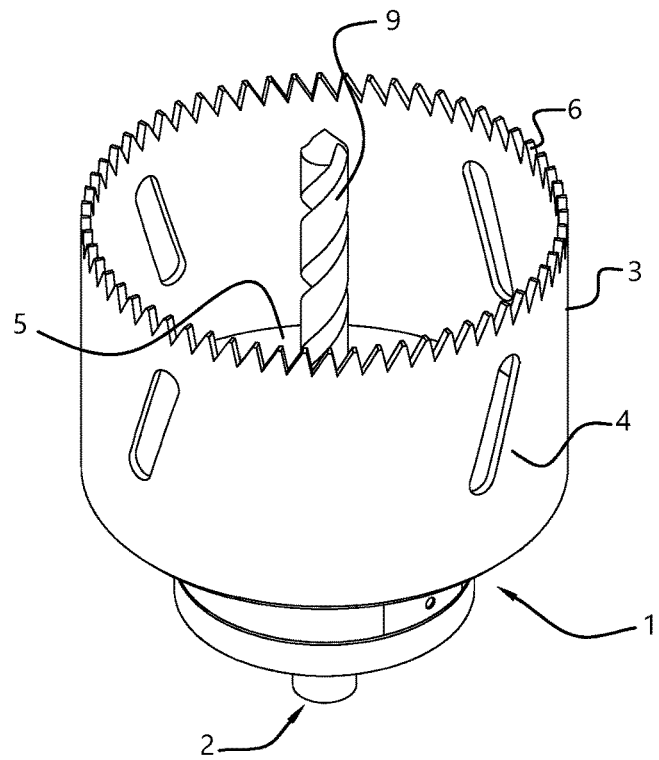
FIG. 1 shows an application of the clamping device on an arbor for holding a hole saw.
Figure 2:
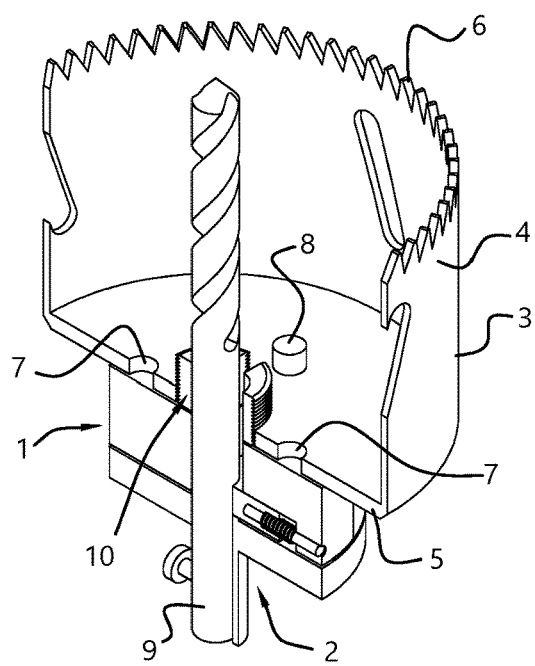
FIG. 2 shows a longitudinal cross section of FIG. 1.

The drawings show features that may be combined as described. In FIG. 1, an embodiment of a clamping device 1 is shown, showing an application of the clamping device 1 on an arbor 2 for holding a hole saw 3. FIG. 2 shows a longitudinal cross section of FIG. 1.

The hole saw 3 is cylinder-shaped with a cylinder wall 4, at one end closed by a bottom wall 5 and at its opposite wall end provided with saw teeth 6.

The bottom wall 5 of the hole saw is here provided with drive holes 7. The arbor 2 is provided with extended drive pins 8 that reach into the drive holes 7 when with the arbor 2 positioned on the hole saw 3, as illustrated. These drive pins 8 are part of an embodiment of a hole saw torque engagement part that transfers torque that is to be transferred from the arbor 2 to the hole saw 3. The drive pins 8 are positioned such that in use the internal thread of the hole saw 3 does not completely locks on the external thread of the arbor 2. Other embodiments of the torque engagement means are possible, but in hole saw design, the drive pins 8 are currently generally accepted. These drive pins 8 usually cooperate with corresponding drive holes 7 in the bottom wall 5 of the hole saw. The drive pins 8 and drive holes 7 are an example of a torque engagement part that further in use block rotation of the hole saw 3 with respect to the arbor 2.

The arbor 2 here holds a twist drill 9 centred in the hole saw 3. The twist drill 9 is usually included in order to allow the hole saw 3 to provide its hole around a pre-defined centre.

The bottom wall 5 of the hole saw 3 is furthermore provided with a centred hole 10 that has an internal screw thread or shortly internal thread 11. The internal thread 11 has a thread form, a pitch between the crests of adjacent threads, and a lead, usually equal to the pitch. Furthermore, the internal thread 11 has a major diameter, a minor diameter, and a pitch diameter.

The major diameter of the internal thread 11 is the larger of two extreme diameters delimiting the height of a thread profile, as a cross-sectional view is taken in a plane containing the axis of the thread.

The minor diameter is the lower extreme diameter of the internal thread 11. Major diameter minus minor diameter, divided by two, equals a height of the thread. The minor diameter of the internal thread 11 is its inside diameter.

The pitch diameter of the internal thread 11 is the diameter of a cylindrical surface that is axially concentric to the internal thread. The cylindrical surface intersects thread flanks at equidistant points, when viewed in a cross-sectional plane containing the axis of the thread. The distance between these points is exactly one half the pitch distance. Equivalently, a line running parallel to the axis and a distance away from it, slices the sharp-V form of the thread at exactly 50% of its height, assuming that the flanks have the proper shape, angle, and pitch for a specified thread standard. The pitch diameter is generally unrelated to the major and minor diameters, especially if the crest and root truncations of the sharp-V form at these diameters are unknown.

Figure 3:
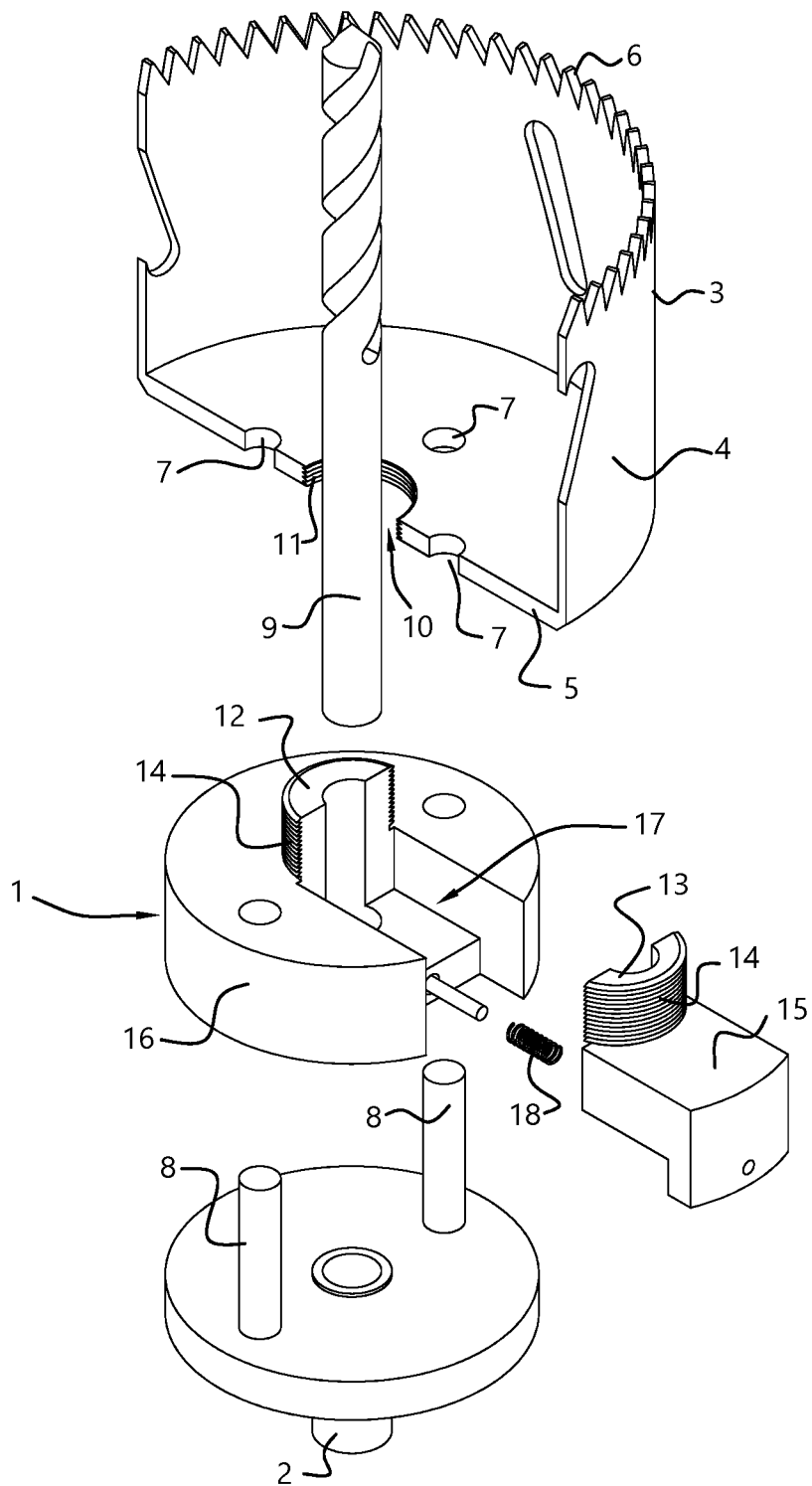
FIG. 3 shows the embodiment of FIG. 2, partly in cross section and partly exploded.

FIG. 3 shows the embodiment of FIG. 2, partly in cross section and partly exploded. It more clearly shows parts of the clamping device 1.

The clamping device in this embodiment has a first thread-engaging part 12 and a second thread-engaging part 13. Both thread-engaging parts 12, 13 extend in longitudinal direction. At their outer surfaces, the thread-engaging parts 12, 13 have sections of external thread 14 that matches the internal thread 11 of the centred hole 11. The first and second thread-engaging parts 12, 13 can move with respect to one another, in this current embodiment in radial direction Ra. In the currently discussed embodiment, the first thread-engaging part 12 is stationary with respect to the arbor 2, and the second thread-engaging part 13 can move in the radial direction Ra with respect to the first thread-engaging part 12. This construction of two thread-engaging parts 12, 13, and one stationary with respect to the arbor, is relatively simple in construction. Other embodiments, with more than two thread-engaging parts can be engineered. Other directions of movement may also be possible.

In the embodiment illustrated in FIG. 3, the second thread-engaging part 13 is mounted on, or here integrally formed as one piece with, a sledge part 15. The first thread-engaging part is here mounted on, or here integrally formed as one piece with, a mounting part 16. The mounting part 16 can be attached to the arbor 2. Mounting part 16 comprises a slide provision 17. The sledge part can be mounted into the slide provision 17 to allow the sledge part 15 to slide back and for the in radial direction Ra on the mounting part 16. Thus, the mounting part 16 with the first thread-engaging part 12 is here stationary with respect to the arbor 2. The sledge part 15 with the second thread-engaging part 13 can displace with respect to the longitudinal axis of the arbor 2. The sledge part 15 is further biased, here spring-biased, via spring 18. The second thread-engaging part 13 is in this way biased away from the longitudinal direction of the arbor 2. The mounting part 16 provides a first abutment for the sledge part 15 with the second thread-engaging part 13 in the first position in which the first and second thread-engaging parts 12, 13 can be inserted in the centred hole 10. The mounting part 16 furthermore in this embodiment has a second abutment for the sledge part 15 in which the second thread-engaging part 13 is at least at the second position. Note that the second abutment may also block the second thread-engaging part 13 at a position in which the second thread-engaging part 13 is further removed from the longitudinal axis of the arbor 2 than in the second position.

The outer surface of the thread-engaging parts 12, 13 here has an external thread that matches the internal thread 11. In this way, the first and second thread-engaging parts 12, 13 can simply and securely engage the internal thread 11 of centred hole 10. There may, however, also be other external surfaces that allow the thread-engaging parts 12, 13 to engage with the internal thread 11 in such a way that the first and second thread-engaging parts can work together to hold and clamp the hole saw 3 onto the arbor 2. In particular, hold and clamp the hole saw 3 in such a way that it will not fall off the arbor 2. An external thread 14 matching the internal thread is a secure and safe choice for the thread-engaging surfaces.

The first and second thread-engaging parts 12, 13 can assume a first position with respect to one another and a second position. This is illustrated in FIGS. 4 and 5.

Figure 4:
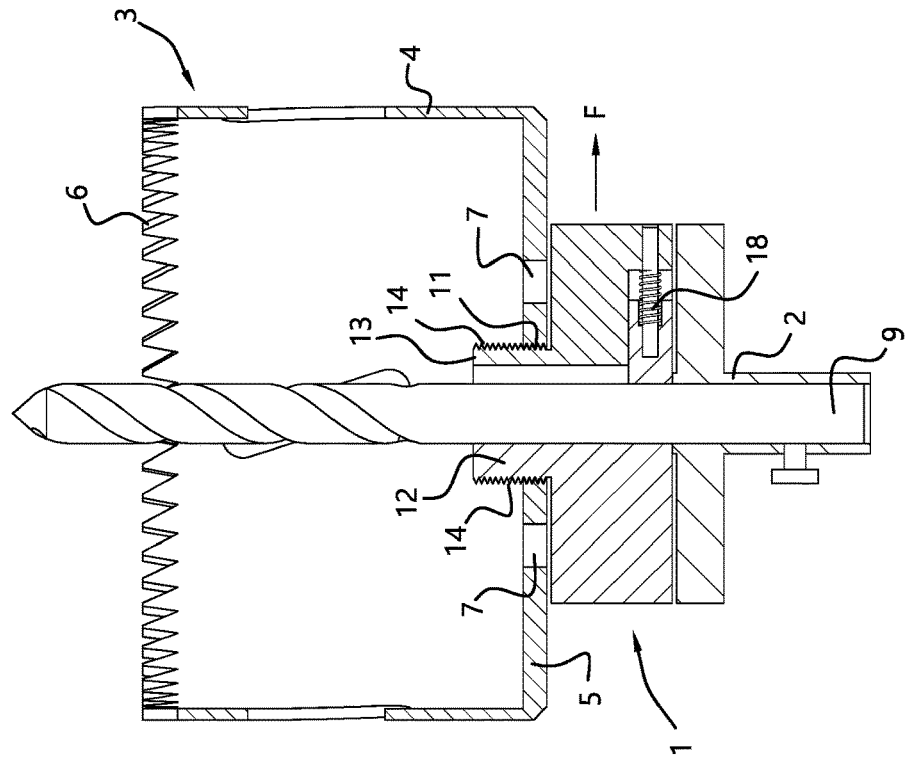
FIG. 4 shows the embodiment of FIGS. 1-3 with the clamping device of the arbor in its first or releasing position.
Figure 5:
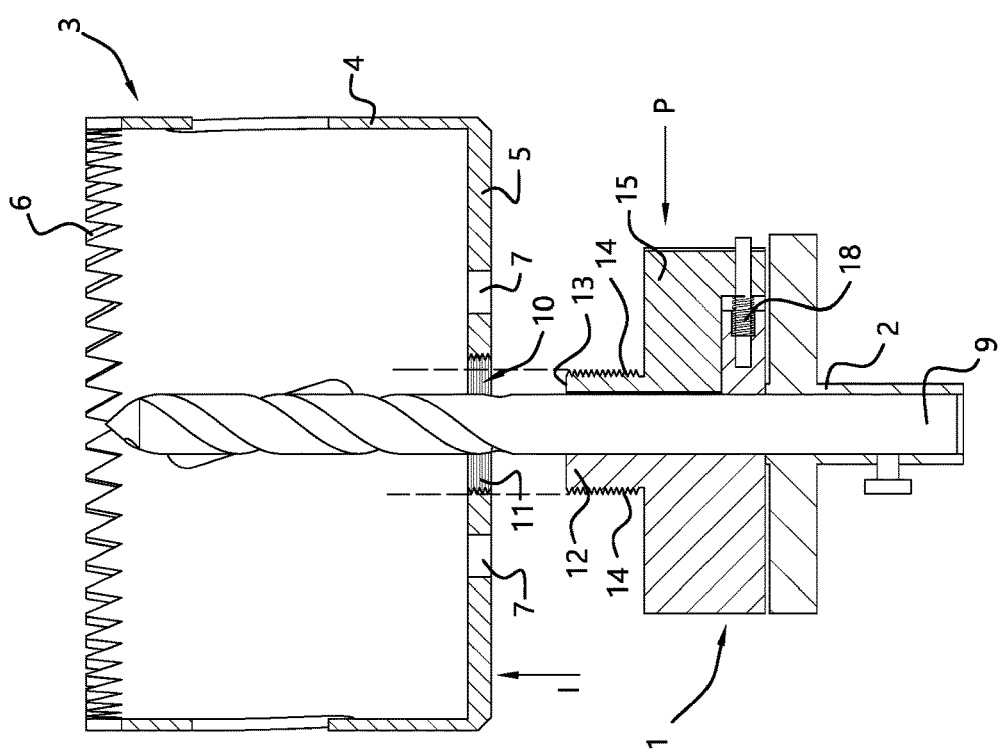
FIG. 5 shows the embodiment of FIGS. 1-3 with the clamping device of the arbor in its second or clamping position.

FIG. 4 shows the embodiment of FIGS. 1-3 with the clamping device 1 of the arbor 2 in its first or releasing position, FIG. 5 shows the embodiment of FIGS. 1-3 with the clamping device 1 in its second or clamping position.

In the embodiment of FIGS. 4 and 5, it is illustrated that in the first position of FIG. 4, the circumference of the thread-engaging parts 12, 13 is such that they can be inserted in the insertion direction 1. Any diameter of the circumference of the thread-engaging parts 12, 13 is smaller that the minor diameter of the internal thread 11 of the centred hole 10, allowing easy insertion of the thread-engaging parts 12, 13 into the centred hole 10.

With the first and second thread-engaging portions 12, 13 in the second position, the first and second thread-engaging portions are here spaced apart.

Figure 6A:
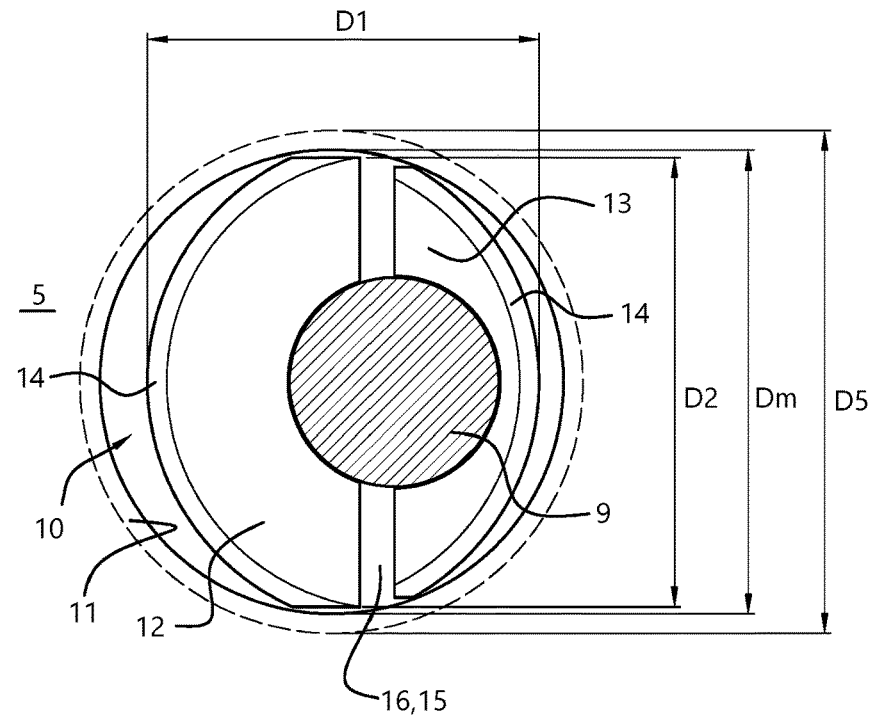
FIGS. 6A and 6B show a working principle of the clamping of a hole saw, with FIG. 6A the first or releasing position, and FIG. 6B the second or clamping position.
Figure 6B:
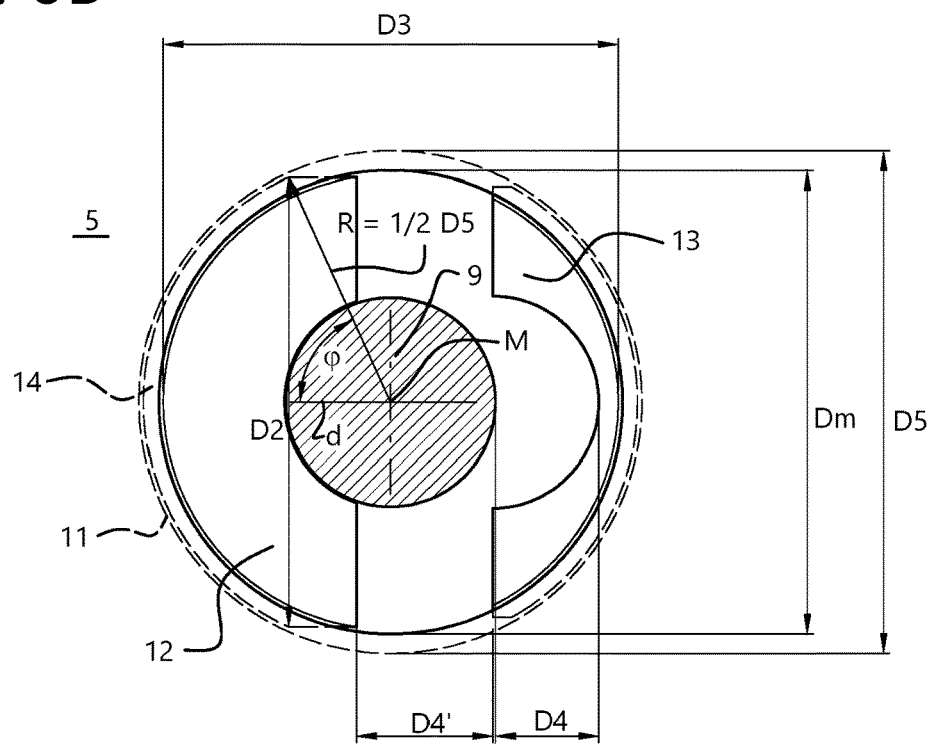
Figure 7:
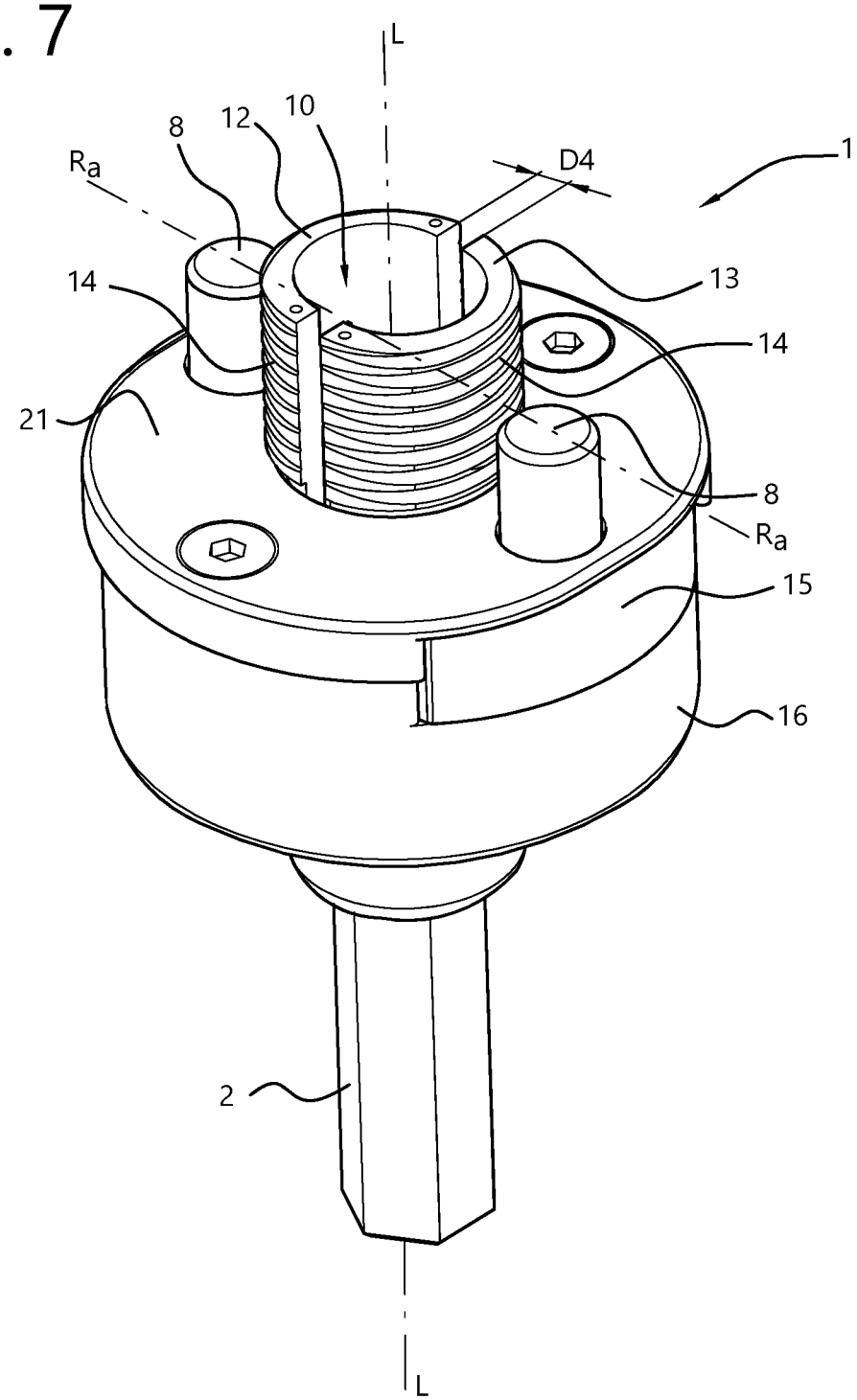

FIGS. 6A and 6B show a working principle of an embodiment of the clamping device, with FIG. 6A the first or releasing position, and FIG. 6B the second or clamping position. In the clamping position, the thread-engaging parts 12, 13 form part of a cylinder, here with an external thread 14. These thread-engaging parts 12, 13 can engage with an internal thread 11 of the internal hole 10. When used for clamping other parts, the central part 9, in case of the hole saw application, may not be present. In these embodiments, a spacing between thread-engaging parts 12, 13 can be selected such that that it allows displacing these parts 12, 13 from their first position to their second position and vice versa.

In the drawings 6A and 6B, diameter D5 is the major diameter of the internal thread 11, diameter Dm is the minor diameter of an internal thread 11 of a hole 10. Diameter D2 is the largest diameter of the thread-engaging parts in their first position. In order to be able to remove the clamping device 1 from the centred hole 10 ('pull it out of the centred hole 10', parallel to the longitudinal direction), diameter D2 should be smaller than diameter Dm. In that way, a quick-release coupling can be provided.

The radius of curvature of the thread-engaging parts corresponds here to the radius of curvature of the hole 10. In case the hole 10 is provided with an internal thread 11 and the thread-engaging parts 12, 13 are provided with (parts of) external thread 14, the radii of curvature of the threads correspond, see FIG. 6B, where the dotted lines almost overlap. In a definition, both the internal thread and the external thread have a pitch diameter. For matching threads, these pitch diameters will substantially match.

In case of the hole saw, the extending twist drill 9 having a diameter complicates the design and dimensioning of the thread-engaging parts. In the embodiment of FIGS. 6A and 6B, the second thread-engaging part 13 has a recess that provides enough clearance for the second thread-engaging part 13 with respect to both the first thread-engaging part 12 and to the twist drill 9 to allow the first and second thread-engaging parts to be displaced back and forth between the first and the second position.

In the embodiment shown in FIGS. 6A and 6B, the first and second thread-engaging parts 12, 13 are horizontal cylinder segments. These thread-engaging parts 12, 13 have parallel longitudinal faces. Both parts have a recess for the central twist drill that usually is part of a hole saw. The recesses are taken out of the longitudinal faces.

In this shown embodiment, part of the thread-engagement parts 12, 13 have been clipped off in order to reduce the maximum diameter D2 of the thread-engaging parts 12, 13. There are several options for making the thread-engaging parts 12, 13 such that their external surface is disengaged from the thread of the hole. The options below are not limiting but illustrate some options available.

One option is to make one (the largest) thread engaging part 12 a half cylinder. The other thread-engaging part 13 should then have a longitudinal face at least 2·(D5−Dm) removed from the longitudinal axis L. Furthermore, a part of the largest thread-engaging part 12 should be clipped as is shown in FIGS. 6A and 6B in order to obtain a largest diameter D2 that is smaller than Dm. The clipping at both ends should reduce the diameter D2 to less than Dm.

Another option is to select both thread-engaging parts 12, 13 with a longitudinal face at a distance from the longitudinal axis. This is done in the embodiment of FIGS. 6A and 6B. The space D4' between both thread-engaging parts 12, 13 in their second or engaged position (or between their longitudinal faces) then is larger than 2·(D5−Dm). In this embodiment, the space D4' is less than a third of diameter D5. Again, when that spacing D4' is close to 2·(D5−Dm), additionally, one or both thread-engaging parts should be clipped as shown in the FIGS. 6A and 6B, in such a way that again the largest diameter D2 is smaller than Dm.

The different options presented above, combinations thereof, and other options that are possibly make it difficult to provide a general mathematical equation for all possible options.

When for instance the thread-engaging part, for instance part 12, is cut along a straight line parallel (solid line) to, but at a distance from, the longitudinal axis, (i.e., having a longitudinal face) creating in fact a horizontal cylinder segments, or in-plate with radial lines of the centred hole, the largest diameter can be calculated via:

$$D2=2\cdot\sqrt{(R^2-d^2)}, \text{ or}$$

$$D2=2\cdot R\cdot\sin(\tfrac{1}{2}\varphi).$$

In any way, D2 is smaller than Dm.

The clamping device may comprise more than two thread-engaging parts, although this may increase complexity. In order to make production easy, the thread-engaging parts can be horizontal cylinder segments, but other cylinder types parts or segments may also be devised.

In an embodiment, as shown in FIGS. 1-6B, the thread-engaging parts 12, 13 are horizontal cylinder sections that have the external thread 14. These cylinder sections are part of an engagement cylinder. From the horizontal cylinder sections, a centre part has been removes, to provide a recess to take up the twist drill of a hole saw assembly. Usually, the recess is in the form of a cylinder. The engagement cylinder has a circumference. Usually, the thread-engaging parts each have less than 40% of the engagement cylinder circumference. In the embodiment shown in the drawings, the thread-engaging part indicated with reference number 12 is stationary and rests against the twist drill. The thread-engaging part with reference number 13 in this embodiment defines a smaller part of the engagement cylinder circumference that the thread-engagement part 12. It in FIGS. 1-5 is placed on the sledge part 15 and in use moves here in radial direction. In an embodiment, the larger thread-engaging part 12 has between 30-40% of the engagement cylinder circumference. The smaller thread-engaging part 13 in an embodiment has between 20-30% of the engagement cylinder circumference.

In the embodiment of FIGS. 1-5, the thread-engaging part 13, or in fact the sledge part 15, is spring-biased in radial outward direction. Usually, the sledge-part 15 has a thread-engaging parts blocking, not indicated. Such a thread-engaging parts blocking can block or fix or lock the position of the thread-engaging parts 12, 13 with respect to one another at or beyond the second or engaging position. In particular, the thread-engaging parts blocking fixes the thread-engaging parts 12, 13 with respect to one another in the second or engaging position. In this way, the clamping device provides the same or almost the same fixing as a regular set of threaded parts with an internal and external thread, respectively, like a bolt and nut. Thus, a hole saw can be mounted and demounted from an arbor 2 swiftly.

The clamping device 1 may be integrated on an arbor 2. Alternatively, the clamping device 1 may be provided as a separate part that can be installed on the arbor 1 after which the arbor is used as a quick-coupling for a hole saw 3.

FIGS. 7-10 show a further embodiment of the clamping device 1. In this embodiment, the first and second thread-engaging part 12, 13 are both moveable. The first and second thread-engaging parts 12, 13 are biased away from one another, here spring-biased via (two) springs 18. Two compression coil springs are here provided parallel at opposite sides of the hole 10. Upon applying pressure, the first and second thread-engaging parts 12, 13 can be pressed towards one another. When pressed together, the thread-engaging parts 12, 13 can be brought into the first position for allowing a tool with internal thread to be removed from or passed onto the clamping part 1. When released, the thread-engaging parts 12, 13 move away from one another. When moving away from one another, the thread-engaging parts 12, 13 move to or even passed the second or engaged position. The combined spring-biasing forces of the springs 18 thus result in opposite, radially working forces on the thread-engaging parts 12, 13.

In the embodiment of FIGS. 7-10, both thread-engaging parts are provided on a sledge part 15 that allows the thread-engaging parts to slide in the mounting part 16. In this embodiment, the thread-engaging parts 12, 13 displace in a substantially and/or functionally parallel, opposite direction. Furthermore, the thread-engaging parts displace while remaining functionally parallel. In this embodiment, the thread-engaging parts can be identical, making the clamping device easier to produce. The mounting part 16 has a central hole that can hold a centring drill 9 that can be used for the hole saw, see also FIGS. 1 and 2. In this embodiment, the hole 10 does not pass through the mounting part 16. A locking bolt 22 may be provided for holding the drill 9.

Figure 8:
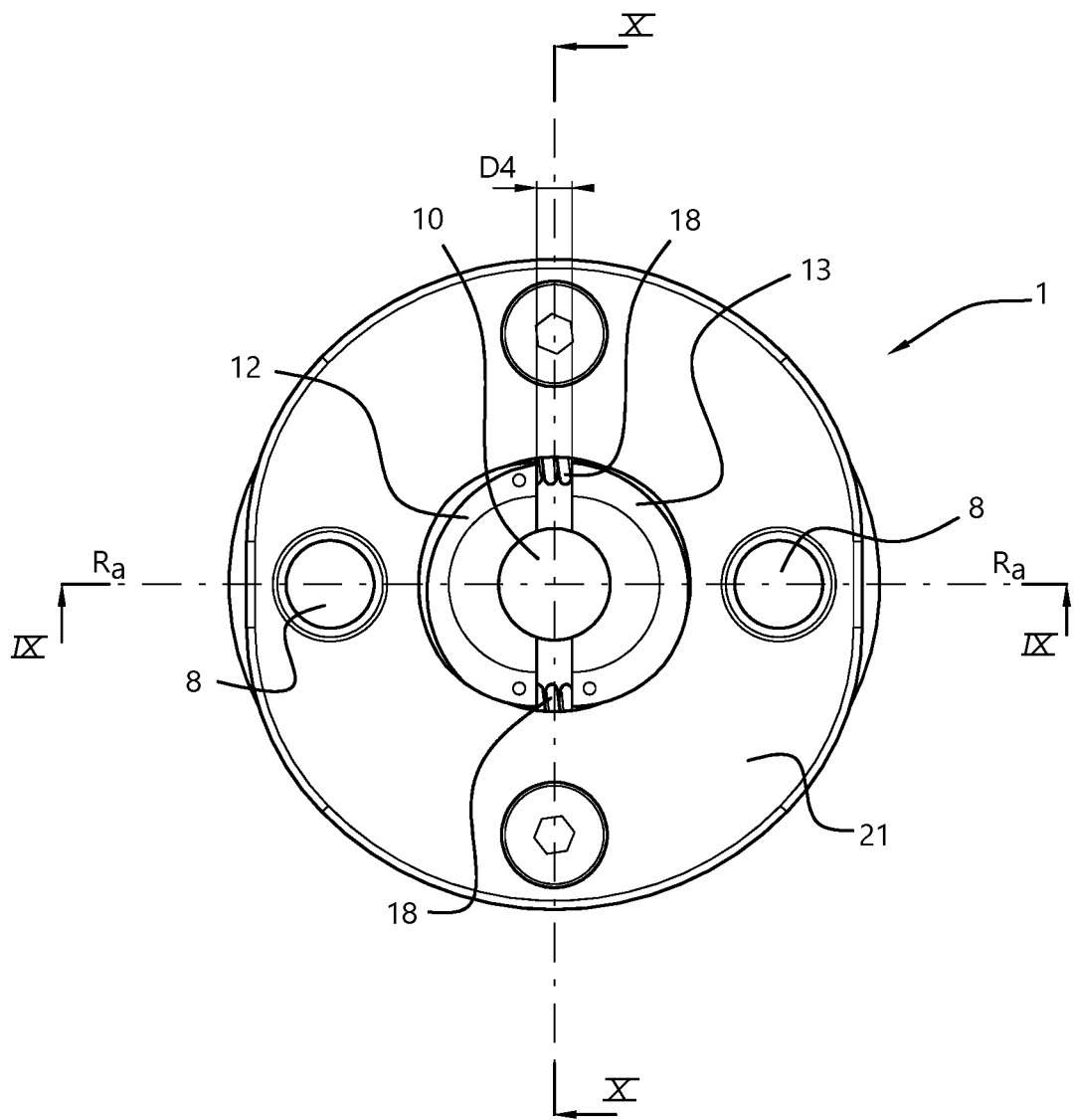
Figure 9:
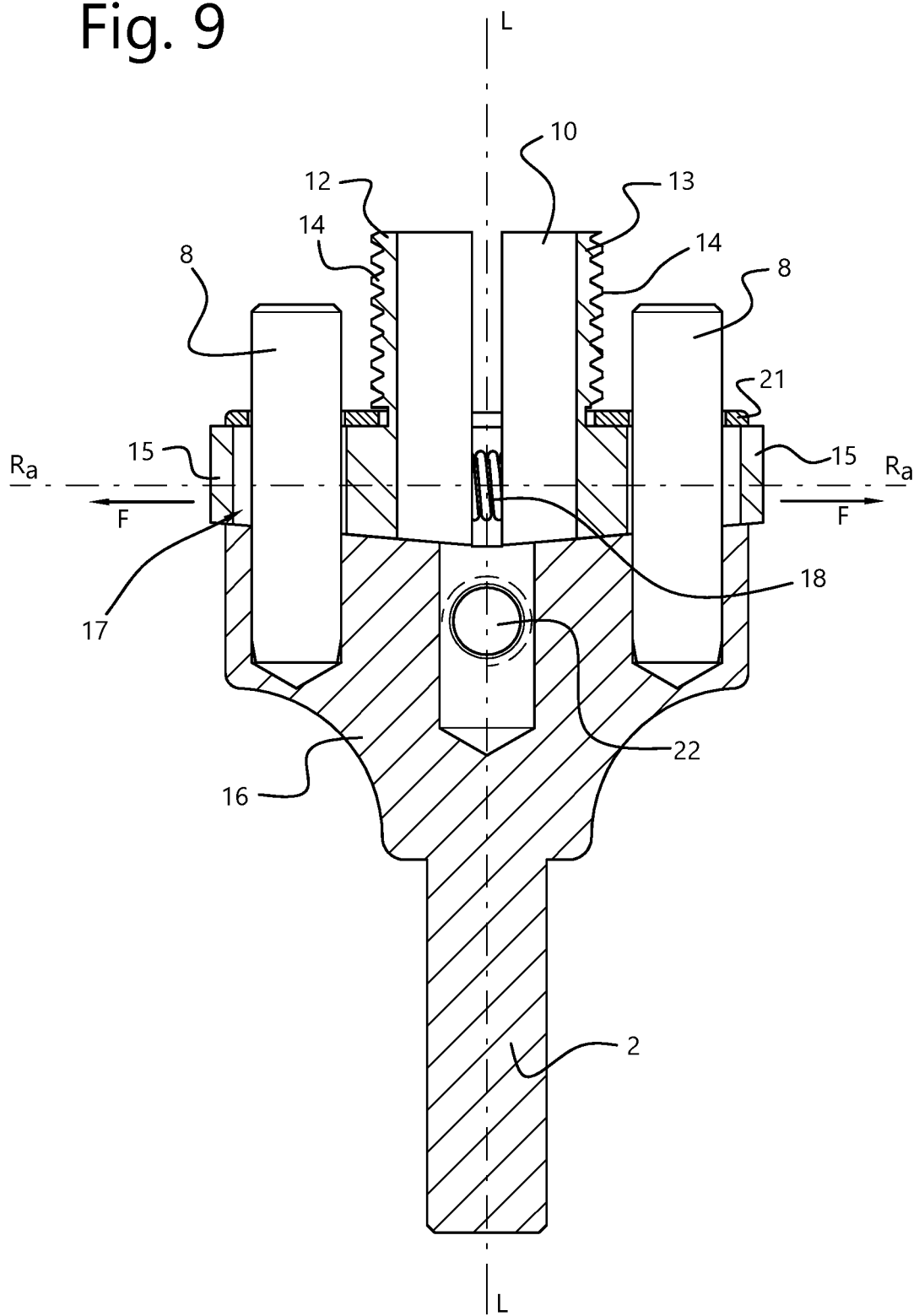
Figure 10:
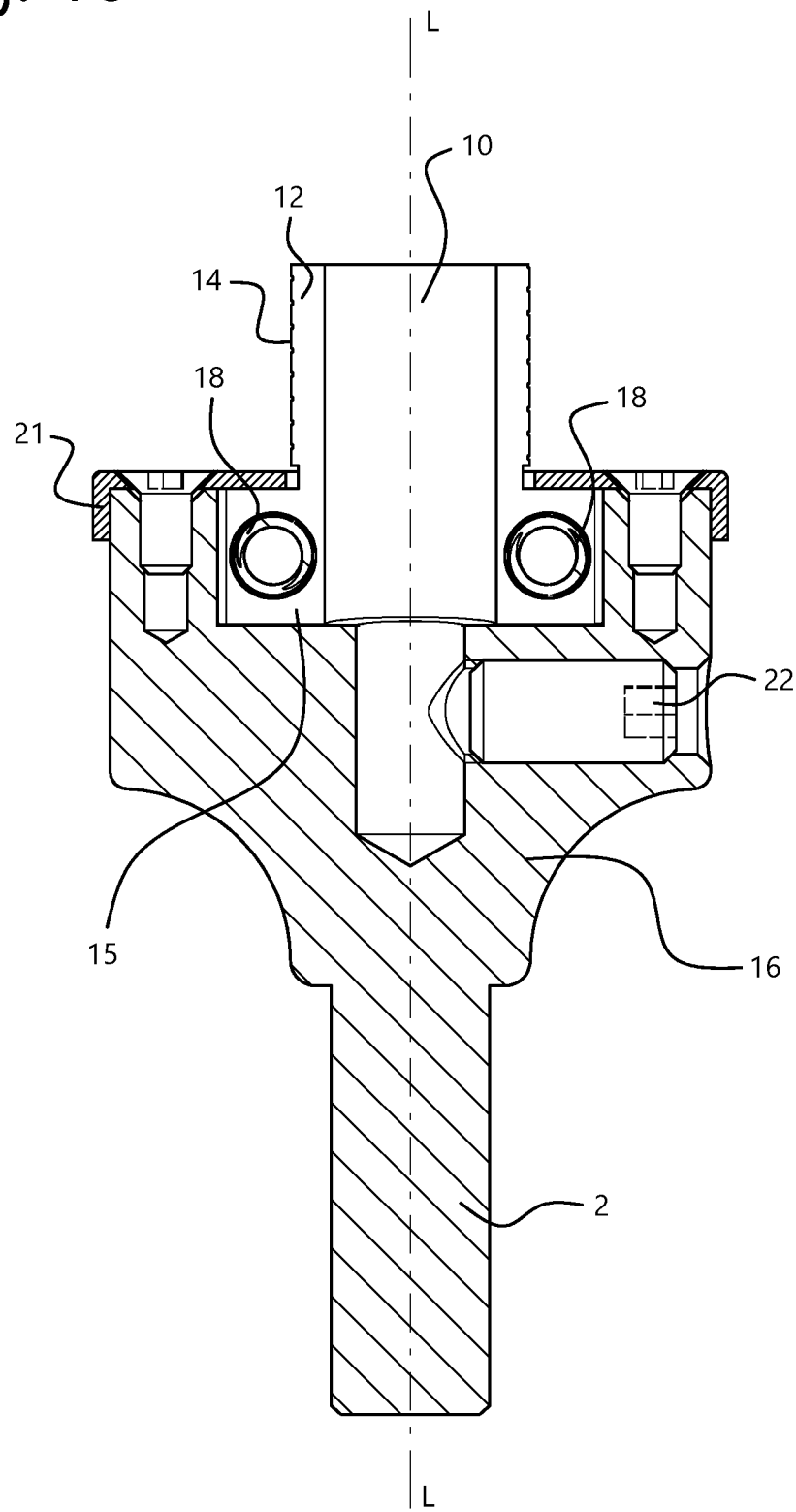

In the embodiment of FIGS. 8-10, the mounting part 16 and sledge parts 15 have a slide provision 17 for providing a linear motion (i.e., along a straight line) when the first and second thread-engaging parts 12, 13 moves between the first and second positions. In this embodiment, the sledges 15 each have a slotted hole. And a pin 8 extending through the slot and fixed into the mounting part. The pin and slotted hole may also be reversed, providing the mounting part 16 with slots and the sledge parts 15 with a pin.

In an alternative embodiment, one or more rails and corresponding runners may be provided on the mounting part 16 and the tread-engaging parts 15, respectively, for providing the linear motion.

In the embodiment of FIGS. 8 and 9, the sledge parts 15 have a lower surface that slide over an upper surface of the mounting part 16 when the sledge parts 15 slide between the first and second positions. In the current embodiment, in order to make the thread of the first and second thread-engaging parts 12, 13 come into engagement with the thread of the part-to-be-engaged 11, 11', the sledge parts 15 further displace under an angle of between 3 and 10 degrees with respect to the radial direction Ra. In particular, the angle is between 4 and 6 degrees. Here, the angle is about 5 degrees.

In order to prevent a possible rotation of a clamped part 5 with respect to the clamping device 1, the clamping device 1 may additionally be provided with a rotation-blocking that engages the clamped part 5. The clamping device 1 is here provided with one or more rotation-blocking members. Such a rotation-blocking member engages a tool, for instance the hole saw bottom wall 5. The one or more rotation-blocking members may comprise one or more pins 8 mounted on the mounting part 16 that is provided to engage a hole in a clamped part 3. In an embodiment, such one or more pins extend functionally parallel to the first and second thread-engaging parts 12, 13. Here, the rotation-blocking pins also provide a motion-guiding for the thread-engaging parts 12, 13, by extending through the slotted holes in the sledges 15 as discussed above.

In the embodiment of FIGS. 7-10, a holding plate 21 is mounted on the mounting part 16 to hold the sledges and thus the thread-engaging parts on the mounting part 16. Here a (radial) length of the slotted hole in each sledge 15 limits the radial motion of the sledges 15. Thus, one end nearest to the longitudinal axis L defines the first position and the opposite end remote from the longitudinal axis L defines the second or engaged position. The holding plate 21 holds the sledges on the mounting part 16, allowing them to slide radially or substantially radially.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

LIST OF REFERENCE NUMBERS

1 clamping device
2 arbor
3 hole saw
4 cylinder wall
5 bottom wall
6 saw teeth
7 drive holes
8 drive pins
9 twist drill
10 centred hole
11 internal thread
12 first thread-engaging part
13 second thread-engaging part
14 external thread
15 sledge part
16 mounting part
17 slide provision
18 spring for application of a spring-biased force
21 holding plate
22 locking for holding a (centering) drill
Ra Radial direction
P direction of applied force to overcome biasing force
I insert direction of insertion of arbor into hole saw
L Longitudinal direction
F direction of (spring) biasing force D1 smallest minor diameter of the external thread of the clamping device
D2 largest major diameter of the external thread of the thread-engaging part in the first or disengaged position
D3 largest minor diameter of the external thread of the clamping device
D4 maximum clearance between the second thread-engaging part 13 and the central twist drill 9
D4' maximum clearance between the first and second thread-engaging parts 12, 13
D5 major diameter of the internal thread 11
Dm minor diameter of the internal thread 11.

The invention claimed is:

1. A hole saw assembly comprising a hole saw and an arbor for coupling said hole saw to a driving tool, said hole saw comprising a bottom wall provided with a hole with internal thread having a major and a minor thread diameter, and said arbor comprising a clamping device having a first and a second thread-engaging part,
said first thread-engaging part extending in a longitudinal direction and having a first external surface for in use engaging the internal thread;
said second thread-engaging part extending in said longitudinal direction and having a second external surface for in use engaging the internal thread;
said first and second thread-engaging parts moveable with respect to one another with a component in a direction perpendicular to said longitudinal direction, allowing said first and second thread-engaging parts to displace between a first or disengaged position with respect to one another for together providing a first circumference allowing retraction from or insertion in said hole in a substantially longitudinal direction, and a second or engaged position having a second circumference that is larger than the first circumference, and in said second position said first and second external surfaces engaging said internal thread for clamping said clamping device in said hole.

2. The hole saw assembly of claim 1, wherein said clamping device comprises a blocking part for blocking said first and second thread-engaging parts in said second position.

3. The hole saw assembly of claim 1, wherein said first and second thread-engaging parts are biased away from one another.

4. The hole saw assembly of claim 1, wherein said external surface of said first and second thread-engaging parts comprise external thread parts corresponding to said internal thread.

5. The hole saw assembly of claim 1, wherein said first and second thread-engaging parts are longitudinal cylinder segments.

6. The hole saw assembly according to claim 1, wherein said first and second thread-engaging parts have a spacing of at least two times the difference between the major and minor thread diameter of the internal thread.

7. The hole saw assembly of claim 1, wherein said thread-engaging parts in said second position have a diameter for engaging the internal thread and blocking removal of said clamping device from said internal thread by displacing said clamping device in longitudinal direction of said internal thread, and in said first position a diameter for staying clear from said internal thread for allowing removing said clamping device from said internal thread by displacing the clamping device in longitudinal direct of said internal thread.

8. The hole saw assembly of claim 1, wherein said first and second thread-engaging parts are spaced apart in said second position, wherein in particular said spacing providing a clearance that measures at least a twice a difference between an major internal thread diameter and a minor internal thread diameter of said internal thread of said hole.

9. The hole saw assembly of claim 1, wherein said first and second thread-engaging parts are biased away from one another at least to said second position, for allowing the first and second thread to be brought into said first position under elevation of said biasing force.

10. The hole saw assembly of claim 1, wherein said first and second thread-engaging parts form part of a threaded end with an external thread, said thread-engaging parts in an embodiment forming circle cylinder segments having a clearance allowing the thread-engaging parts to be displaced between the first and second position, in particular said thread-engaging parts in said second position forming part of a circle cylinder, and for displacing between said first and second position, said thread-engaging parts displace in functionally, in particular substantially a radial direction of said circle cylinder.

11. The hole saw assembly of claim 1, wherein said first and second thread-engaging parts are spaced apart in said second position, wherein in particular said spacing providing a clearance that measures at least a difference between a major internal thread diameter and a minor internal thread diameter of a given internal thread into which said clamping device is designed to clamp.

12. The hole saw assembly of claim 1, wherein said first and second thread-engaging parts are biased away from one another at least to said second position, for allowing the first and second thread to be brought into said first position under elevation of said biasing force.

* * * * *